United States Patent [19]
Bitar et al.

(10) Patent No.: US 7,583,856 B2
(45) Date of Patent: Sep. 1, 2009

(54) METHOD FOR DETERMINING OPTIMAL CHAMFER MASK COEFFICIENTS FOR DISTANCE TRANSFORM (75) Inventors: Elias Bitar, Toulouse (FR); Nicolas Marty, Castelginest (FR)

(73) Assignee: Thales, Neuilly sur Seine (FR)

( * ) Notice: Subject to any disclaimer, the term of this patent is extended or adjusted under 35 U.S.C. 154(b) by 383 days.

(21) Appl. No.: 10/577,063

(22) PCT Filed: Oct. 21, 2004

(86) PCT No.: PCT/EP2004/052606

§ 371 (c)(1),
(2), (4) Date: Apr. 24, 2006

(87) PCT Pub. No.: WO2005/041126

PCT Pub. Date: May 6, 2005

(65) Prior Publication Data
US 2007/0053609 A1 Mar. 8, 2007

(30) Foreign Application Priority Data
Oct. 24, 2003 (FR) ................................. 03 12490

(51) Int. Cl.
G06K 9/20 (2006.01)
(52) U.S. Cl. ...................... 382/283; 382/181
(58) Field of Classification Search ............... 382/181, 382/283
See application file for complete search history.

(56) References Cited
U.S. PATENT DOCUMENTS

2007/0031007 A1* 2/2007 Bitar .......................... 382/106
2007/0088492 A1* 4/2007 Bitar et al. .................. 701/120
2007/0116357 A1* 5/2007 Dewaele ..................... 382/173
2007/0187554 A1* 8/2007 Bitar et al. .................. 244/175
2007/0285283 A1* 12/2007 Bitar et al. .................. 340/963

OTHER PUBLICATIONS

Borgefors G: "Distance Transformations in Digital Images" Computer Vision Graphics and Image Processing, Academic Press, Duluth, MA, vol. 34, 1986, pp. 344-371.

(Continued)

Primary Examiner—Charles Kim
Assistant Examiner—Stephen R Koziol
(74) Attorney, Agent, or Firm—Lowe Hauptman Ham & Berner, LLP (57) ABSTRACT The coefficients of a chamfer mask are, to within a multiplicative scale factor making it possible to give them an integer value, approximations of the Euclidian distances separating the pixels covered by the mask, from the pixel under analysis placed at the center of the mask. As there are at least two possible integer values for each coefficient, the over- and the under-approximation, one is rapidly faced with a considerable number of possible combinations. The method proposed allows progressive selection of the possible integer values, firstly at the level of each coefficient by virtue of an axis error rate criterion, then at the level of the coefficients considered by binomials by virtue of a sector error rate criterion, which considerably reduces the number of combinations to be analyzed to arrive at an optimal combination from the point of view of the error rate obtained in the distance estimations.

12 Claims, 6 Drawing Sheets

OTHER PUBLICATIONS

C. Fouard, G. Malandain: "Automatic calculation of chamfer mask coefficients for large masks and anisotropic images" Rapport De Recherche Institut National De Recherche en Informatique et en Automatique May 4, 2004 Section 5.3 "Finding the optimal coefficients".

Coquin D et al: "Discrete distance operator on rectangular grids" Pattern Recognition Letters, North Holland Publ. Amsterdam NL Sep. 1, 1995, pp. 911-923.

* cited by examiner

| | | $\sqrt{(4r^2+1)}$ | | $\sqrt{(4r^2+1)}$ | |
|---|---|---|---|---|---|
| $\sqrt{(r^2+4)}$ | $\sqrt{(r^2+1)}$ | r | $\sqrt{(r^2+1)}$ | $\sqrt{(r^2+4)}$ |
| | 1 | 0 | 1 | |
| $\sqrt{(r^2+4)}$ | $\sqrt{(r^2+1)}$ | r | $\sqrt{(r^2+1)}$ | $\sqrt{(r^2+4)}$ |
| | | $\sqrt{(4r^2+1)}$ | | $\sqrt{(4r^2+1)}$ | |

METHOD FOR DETERMINING OPTIMAL CHAMFER MASK COEFFICIENTS FOR DISTANCE TRANSFORM

BACKGROUND OF THE INVENTION

1. Field of the Invention

The invention pertains to the estimation of Euclidian distance between points or objects of an isotropic or nonisotropic image, with a bounded relative error, by application of a chamfer distance transform (or "chamfer Euclidian distance transform"). It applies in particular to the estimation of Euclidian distances between points of an image consisting of a map of a portion of spherical surface, such as that of the terrestrial globe, exhibiting an anisotropy due to the convergence of the meridians towards the poles.

2. Description of the Related Art

Chamfer distance transforms are widely used in image analysis. Gunilla Borgefors describes examples thereof in her article entitled "Distance Transformation in Digital Images." Published in the journal: Computer Vision, Graphics and Image Processing, Vol. 34 pp. 344-378 in February 1986.

Chamfer distance transforms estimate, in an image, the Euclidian distance separating a pixel referred to as the goal pixel from another pixel referred to as the source pixel on the basis of the length of the shortest path, going from the source pixel to the goal pixel and passing through pixels of the image, which path is chosen from among a limited selection of the various possible paths which take account only of the paths passing through close points neighboring the goal point and following, over their parts going from the source point to a close neighboring point, the shortest path determined in the course of distance estimations made earlier.

To undertake the limited selection of the paths serving to establish a distance estimation of a goal point, the chamfer distance transforms analyze, in turn, all the pixels of an image, in the course of a complete scan of the image.

In order for the path selection performed for each pixel of the image to definitely enclose a path of minimum length, the scan must satisfy a regularity constraint. G. Borgefors proposes, to satisfy this regularity constraint, that the pixels of an image be scanned twice consecutively, in two mutually inverse orders, namely either lexicographic order, the image being analyzed from top to bottom, line by line and from left to right within each line, and inverse lexicographic order, or else transposed lexicographic order, the image having undergone a 90° rotation, and inverse transposed lexicographic order.

The analysis of a pixel is done by means of a chamfer mask cataloging the distances separating the pixel under analysis from the pixels that are closest in the various directions, the meshing of the pixels of the image being assumed to be regular. It consists in selecting the pixels of the close neighborhood which, on the one hand have already received a distance estimation in the course of the same scan pass and, on the other hand whose distances to the pixel under analysis are mentioned in the chamfer mask, in cataloging the paths going, at the shortest, from the source pixel to the pixel under analysis while passing through the various selected pixels of the close neighborhood, in estimating the lengths of each of these paths by summation of the distance estimation for the pixel of the close neighborhood followed by the path considered and of the distance of the same pixel from the close neighborhood to the pixel under analysis, and in likening the distance of the pixel under analysis to the shortest length of the paths cataloged.

Chamfer distance transforms have various benefits of which the main ones are: a reduction in the complexity of the calculations of Euclidian distance estimation by virtue of exclusive use of integers made at the price of approximations and a complexity of calculation which, while being lesser, remains constant and does not increase with the presence of obstacles in the image unlike the complexity of the conventional Euclidian distance calculation which grows with the presence of obstacles in the image.

The distance values adopted for coefficients of the chamfer mask are in fact expressed with the aid of integers which correspond, to within a multiplicative scale factor and to within an approximation, to the Euclidian distances separating the pixel under analysis from its close neighbors. In the examples proposed by G. Borgefors, for an image whose pixels have an isotropic distribution, the chamfer mask is of dimensions 3×3 or 5×5. When it is of dimensions 3×3, the chamfer mask encloses two integer values of coefficients: 3 for the shortest of the neighborhood distances which corresponds to the distance of the closest pixels on the same row and the same column as the pixel under analysis and which serves as multiplicative scale factor and distance measurement unit, and 4 for a second neighborhood distance corresponding to that of the pixels closest on the diagonals, the value 4 approximating the true Euclidian distance which is 3$\sqrt{2}$). When it is of dimension 5×5, the chamfer mask encloses three integer values of coefficients: 5 for the first neighborhood distance and the multiplicative scale factor, 7 instead of 5$\sqrt{2}$, for the second neighborhood distance and 11 instead of 5$\sqrt{5}$ for a third neighborhood distance.

The choice of the integer values of the coefficients of the chamfer mask is unlimited and is made by adopting an arbitrary multiplicative factor and then by taking as coefficients, the integer values that most closely approach the products by the multiplicative factor, of the Euclidian neighborhood distances.

The errors made in the distance estimations by means of chamfer distance transforms are related to the approximations in the various neighborhood distances made in the coefficients of the chamfer mask. Their reductions involve an optimum choice of the combination of the various approximations made in the coefficients of the chamfer mask over the neighborhood distances. They may also be reduced through an increase in the multiplicative scale factor but this increase in the multiplicative factor leads to an increase in all the integer values adopted for the coefficients of the chamfer mask which has an impact on the complexity of the calculations of the distance estimations.

The problem then arises of choosing, for the coefficients of the chamfer mask, the smallest possible integer values making it possible to obtain the desired accuracy in the estimates of the distances, doing so in order to reduce the complexity of the calculations as far as possible.

The problem of the choice of the optimal coefficients of the chamfer mask is made difficult by the very large number of possibilities offered for one and the same multiplicative scale factor once the chamfer mask exceeds a certain size, the integer value chosen for each coefficient possibly being either an under-approximation, or an over-approximation, of the Euclidian distance of the neighboring pixel concerned. This problem becomes even more critical when the choice is valid only over a part of the image on account of an anisotropy phenomenon such as is the case, for example for an image formed by a map of a portion of the surface of the terrestrial globe that is derived from a terrain elevation database made from a regular latitude and longitude meshing.

The natural procedure for choosing, in an optimal manner, the coefficients of the chamfer mask consists in testing all the possibilities for a given multiplicative scale factor, by calculating, for each possibility, the errors committed in distance estimations made for all the pixels of the image with respect to a source pixel, and in retaining the possibility corresponding to the minimum error rate. This procedure, which is akin to the so-called "brute force" procedures, demands a considerable amount of calculation especially in the cases where none of the possibilities tested makes it possible to achieve the accuracy sought in the distance measurements and where one is compelled to increase the multiplicative scale factor and to recommence the tests on the new possibilities offered after increasing the multiplicative scale factor.

Various methods have been proposed for choosing the coefficients of a chamfer mask in an optimal manner at a lower calculation cost than the natural procedure. Most of them make it possible to determine the coefficients of the chamfer mask on the basis of a multiplicative scale factor chosen arbitrarily by seeking to decrease the deviation in surface area existing between the Euclidian disk and a convex polygon termed the "chamfer polygon", the distances from whose vertices to the center correspond to the values of the coefficients of the chamfer mask. However, these methods rapidly become tricky to implement when the Euclidian disk is deformed by an anisotropy of the image.

SUMMARY OF THE INVENTION

The aim of the invention is the determination of the optimal coefficients of a chamfer mask, within the framework of an image that may be anisotropic, and at a lower calculation cost than the natural procedure.

It is likewise aimed at a determination of the optimal coefficients of a chamfer filter allowing exact calculation of the errors made in the distance estimations.

It is also aimed at a direct calculation of the optimal integer coefficients of a chamfer mask.

It is likewise aimed at the calculation of the optimal coefficients of a chamfer mask corresponding to a given multiplicative scale factor.

The invention is directed to a method of determining the optimal coefficients $C_{i,j}$, i being a row index varying from $-P$ to $+P$ and j a column index varying from $-Q$ to $+Q$, P and Q being positive integers, of a distance transform chamfer mask providing estimations of distance between pixels of an image, said coefficients being approximations, to within a multiplicative scale factor n, n being a positive integer, of the distances of an image pixel subjected to the analysis of the chamfer mask with respect to the image pixels that are closest in the various so-called pixel directions of the mask, each coefficient being associated with the pixel of the mask whose distance it represents, and the determination consisting of a choice, for each coefficient, of a value selected from among a set of candidate values for the coefficient considered. This method is noteworthy in that it uses, as choice criteria:

the maximum distance estimation error rate caused by the choice of a candidate value for a coefficient, in the estimations of distances of the image pixels aligned on an axis of displacement of the image corresponding to the direction going from an origin source pixel for the distance measurements that is subjected to the analysis of the chamfer mask to the pixel of the mask associated with the coefficient considered, and the maximum distance estimation error rate caused by the choice of two candidate values for a pair of coefficients, in the distance estimations of the image pixels contained in an angular sector of the image, delimited by two axes of displacement of the image corresponding to the directions going from the source pixel subjected to the analysis of the chamfer mask to the two pixels of the mask that are associated with the coefficients considered.

Advantageously, when a maximum error rate x % is prescribed, the method of determining the optimum coefficients of a chamfer mask comprises the following steps:

calculation, as a function of the multiplicative scale factor n, of the pairs $A_{i,j}$ of integer values corresponding to the under- and over-approximations of each of the distances of the pixels of the mask with respect to the pixel subjected to the analysis of the mask, the integer values of a pair $A_{i,j}$ being candidates for the coefficient $C_{i,j}$ of the chamfer mask assigned to the pixel of the mask of which they are an approximation of the distance, adoption of a pixel of the image as origin source pixel for the distance measurements, calculation, for each candidate integer value for a coefficient, of the distance estimation error rate for image pixels aligned on an axis of displacement of the image corresponding to the direction going from an origin source pixel for the distance measurements that is subjected to the analysis of the chamfer mask to the pixel of the mask associated with the coefficient considered, first sort operation among the candidate integer values consisting in eliminating those for which the axis error rate exceeds the maximum allowable error rate x %, stopping of the determination of the coefficients of the chamfer mask as soon as the two integer values of one of the pairs $A_{i,j}$ are eliminated, if all the initial pairs $A_{i,j}$ retain at least one integer value after the first sort operation, continuation of the determination of the coefficients of the mask by splitting the chamfer mask and the image into 2(P+Q) mutually contiguous oriented angular sectors $S_k$ having as vertex, the pixel under analysis and, as sides, axes of displacement of the image corresponding to the direction going from the source pixel subjected to the analysis of the chamfer mask to a pixel of the mask, and encompassing no other pixel of the mask, calculation, for each angular sector $S_k$ and for each binomial of candidate integer values for the two coefficients associated with the two pixels of the mask that are placed on the sides of the angular sector $S_k$ considered of the distance estimation error rate for pixels of the image belonging to the sector $S_k$ considered, second sort operation among the binomials of candidate integer values for two coefficients associated with two pixels of the mask that are placed on the sides of an angular sector $S_k$ consisting in rejecting those for which the axis error rate exceeds the maximum allowable error rate x %, construction, on the basis of the binomials of integer values arising from the second sort operation, of a combination of candidate integer values for each of the coefficients of the chamfer mask, testing of the result of the construction, if it was not possible to construct any combination stoppage of the determination of the coefficients of the chamfer mask, if it was possible to construct at least one combination, adoption of one of them for the coefficients of the chamfer mask.

Advantageously, the above method is supplemented with a step of verification of compliance with the conditions of U. Montanari by the chosen combination.

Advantageously, the construction, on the basis of the binomials of integer values arising from the second sort operation, of a combination of candidate integer values for each of the coefficients of the chamfer mask is done progressively, taking the coefficients in the order of the angular sectors.

Advantageously, the above method of determining the optimal coefficients $C_{i,j}$ of a chamfer mask is iteratively repeated with an increase in the multiplicative scale factor or in the maximum error rate x % prescribed each time that it ends in a failure, either following the first sort operation, or following the second sort operation.

Advantageously, the method of determining the optimal coefficients of a chamfer mask comprises the following steps:

calculation, as a function of the multiplicative scale factor n, of the pairs $A_{i,j}$ of integer values corresponding to the under- and over-approximations of each of the Euclidian distances of the pixels of the mask with respect to the pixel subjected to the analysis of the mask, the integer values of a pair $A_{i,j}$ being eligible for the coefficient $C_{i,j}$ of the chamfer mask assigned to the pixel of the mask of which they are an approximation of the distance, adoption of a pixel of the image as origin source pixel for the distance measurements, calculation, for each candidate integer value for a coefficient, of the distance estimation error rate for image pixels aligned on an axis of displacement of the image corresponding to the direction going from an origin source pixel for the distance measurements that is subjected to the analysis of the chamfer mask to the pixel of the mask associated with the coefficient considered, assigning to each candidate integer value, in the guise of notation, of the axis error rate corresponding thereto, calculation, for each angular sector $S_k$ and for each binomial of candidate integer values for the two coefficients associated with the two pixels of the mask that are placed on the sides of the angular sector $S_k$ considered, of the distance estimation error rate for pixels of the image belonging to the sector $S_k$ considered, assignment, to each binomial of candidate integer values that served for the calculation of a sector error rate, of a notation consisting of the highest value of the sector error rate corresponding thereto and of the axis error rates associated with the candidate integer values of which it is composed, and construction of a combination of candidate integer values for each of the coefficients of the chamfer mask, on the basis of the binomials of integer values having the smallest possible notations.

Advantageously, the above method is supplemented with a step of verification of compliance with the conditions of U. Montanari by the chosen combination.

Advantageously, the construction, on the basis of the binomials of integer values, of a combination of candidate integer values for each of the coefficients of the chamfer mask is done progressively, taking the coefficients in the order of the angular sectors.

Advantageously, the method of determining the optimal coefficients is applied to the chamfer masks used for the estimation of the distances, with respect to a craft, of the points of a zone of the terrestrial surface where it is deployed, when this zone is represented by a two-dimensional map, derived from a terrain elevation database produced using a regular latitude and longitude meshing of the terrestrial surface.

BRIEF DESCRIPTION OF THE DRAWINGS

Other characteristics and advantages of the invention will emerge from the description herein below of an embodiment given by way of example. This description will be offered in conjunction with the drawing in which:

a FIG. 1 represents an exemplary chamfer mask,

FIGS. 2*a* and 2*b* show the cells of the chamfer mask illustrated in FIG. 1, which are used in a scan pass according to lexicographic order and in a scan pass according to inverse lexicographic order, a FIG. 3 shows the deformation of a chamfer mask occasioned by the anisotropy of an image having differently spaced pixels in the direction of the rows and in the direction of the columns, a FIG. 4 is a chart illustrating the displacement axes associated with the coefficients of the upper right quarter of the chamfer mask shown in FIG. 1, FIGS. 5*a* and 5*b* are charts showing minimum length paths for goal pixels placed in the image, on an axis of displacement or in a sector, a FIG. 6 is a chart showing that aligned goal pixels are linked to a source pixel by homothetic paths of minimal lengths, a FIG. 7 is a chart illustrating the main steps of a method, in accordance with the invention, for determining the optimal coefficients of a chamfer mask, a FIG. 8 is a chart illustrating the main steps of another method, in accordance with the invention, for determining the optimal coefficients of a chamfer mask.

DETAILED DESCRIPTION OF THE EMBODIMENTS

The distance between two points of a surface is the minimum length of all the possible routes over the surface starting from one of the points and finishing at the other. In an image formed of pixels distributed according to a regular mesh of rows, columns and diagonals, a propagation-based distance transform estimates the distance of a pixel termed "goal" pixel with respect to a pixel termed "source" pixel by constructing progressively, starting from the source pixel, the shortest possible path following the mesh of pixels and finishing at the goal pixel, being aided by the distances found for the image pixels already analyzed and an array termed a chamfer mask cataloging the values of the distances between a pixel and its close neighbors.

Figure 1:
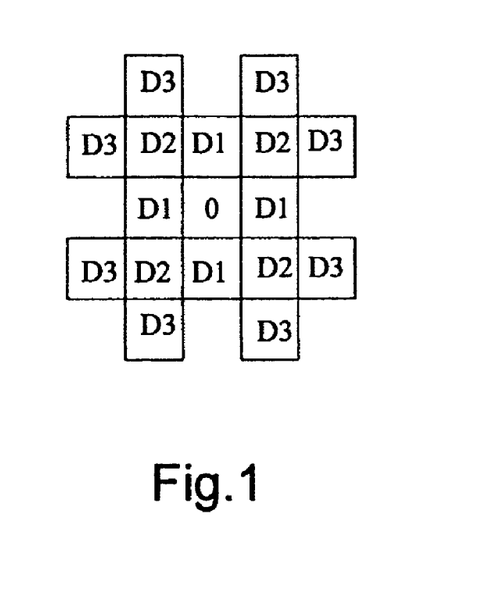

As shown in FIG. 1, a chamfer mask takes the form of an array with an arrangement of boxes reproducing the pattern of a pixel surrounded by its close neighbors. At the center of the pattern, a box assigned the value 0 labels the pixel taken as origin of the distances cataloged in the array. Around this central box are clustered peripheral boxes filled with non-zero proximity distance values and mimicking the arrangement of the pixels of the neighborhood of a pixel assumed to occupy the central box. The proximity distance value appearing in a peripheral box is that of the distance separating a pixel occupying the position of the peripheral box concerned, from a pixel occupying the position of the central box. It is noted that the proximity distance values are distributed as concentric circles. A first circle of four boxes corresponding to the four pixels of first rank that are closest to the pixel of the central box either on the same row or on the same column are assigned a proximity distance value D1. A second circle of four boxes corresponding to the four pixels of second rank that are closest to the pixel of the central box that are placed on the diagonals are assigned a proximity distance value D2. A third circle of eight boxes corresponding to the eight pixels of third rank that are closest to the pixel of the central box while remaining outside the row, the column and the diagonals of the pixel of the central box are assigned a proximity distance value D3.

The chamfer mask can cover a neighborhood of greater or lesser extent of the pixel of the central box by cataloging the values of the proximity distances of a greater or lesser number of concentric circles of pixels of the neighborhood. It may be reduced to the first two circles formed by the pixels of the neighborhood of a pixel occupying the central box or be extended beyond the first three circles formed by the pixels of the neighborhood of the pixel of the central box but it is customary to stop at three first circles. The values of the proximity distances D1, D2, D3 which correspond to Euclidian distances are expressed in a scale whose multiplicative factor permits the use of integers at the cost of a certain approximation. Thus, G. Borgefors adopts a scale corresponding to a multiplicative factor 5. She gives the value 5 to the distance D1 corresponding to an echelon with abscissa x or with ordinate y, the value 7, which is an approximation of $5\sqrt{2}$, to the distance D2 corresponding to the root of the sum of the squares of the echelons with abscissa and ordinate $\sqrt{x^2+y^2}$, and the value 11, which is an approximation of $5\sqrt{5}$, to the distance D3.

The progressive construction of the shortest possible path going to a goal pixel, starting from a source pixel and following the mesh of pixels is done by regular scanning of the pixels of the image by means of the chamfer mask. Initially, the pixels of the image are assigned an infinite distance value, in fact a number high enough to exceed all the values of the distances measurable in the image, with the exception of the source pixel which is assigned a zero distance value. Then the initial distance values assigned to the goal points are updated in the course of the scan of the image by the chamfer mask, an update consisting in replacing a distance value allocated to a goal point with a new lesser value resulting from a distance estimation made on the occasion of a new application of the chamfer mask to the goal point considered.

An estimation of distance by application of the chamfer mask to a goal pixel consists in cataloging all the paths going from this goal pixel to the source pixel and passing through a pixel of the neighborhood of the goal pixel whose distance has already been estimated in the course of the same scan, in searching from among the paths cataloged, for the shortest path or paths and in adopting the length of the shortest path or paths as distance estimation. This is done by placing the goal pixel whose distance it is desired to estimate in the central box of the chamfer mask, while selecting the peripheral boxes of the chamfer mask corresponding to pixels of the neighborhood whose distance has just been updated, while calculating the lengths of the shortest paths connecting the goal pixel to be updated to the source pixel while passing through one of the selected pixels of the neighborhood, by addition of the proximity distance value assigned to the pixel of the neighborhood concerned and of the distance value given by the chamfer mask, and in adopting, as distance estimation, the minimum of the path length values obtained and of the old distance value assigned to the pixel undergoing analysis.

The order of scanning of the pixels of the image influences the reliability of the distance estimations and of their updates since the paths taken into account depend thereon. In fact, it is subject to a regularity constraint which implies that if the pixels of the image are labeled in lexicographic order (pixels ranked in row-by-row ascending order starting from the top of the image and progressing toward the bottom of the image, and from left to right within a row), and if a pixel p has been analyzed before a pixel q then a pixel p+x must be analyzed before the pixel q+x. The lexicographic order inverse lexicographic order (scanning of the pixels of the image row-by-row from bottom to top and, within a row, from right to left), transposed lexicographic order (scanning of the pixels of the image column-by-column from left to right and, within a column, from top to bottom), inverse transposed lexicographic order (scanning of the pixels by columns from right to left and within a column from bottom to top) satisfy this regularity condition and more generally all scans in which the rows and columns are scanned from right to left or from left to right. G. Borgefors advocates a double scan of the pixels of the image, once in lexicographic order and another time in inverse lexicographic order.

Figure 2A:
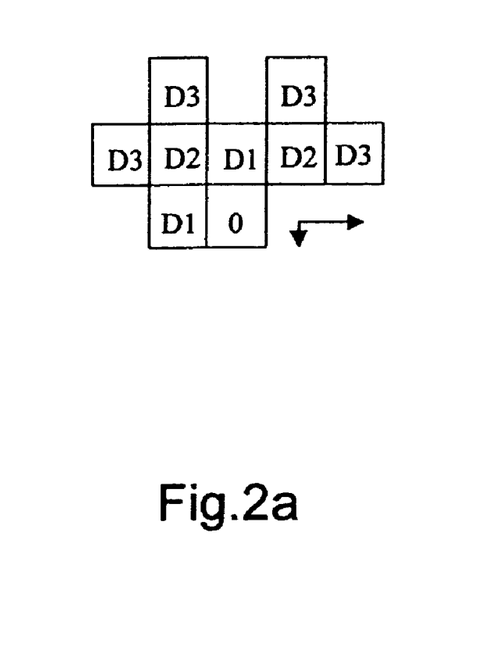

FIG. 2a shows, in the case of a scan pass in lexicographic order going from the upper left corner to the lower right corner of the image, the boxes of the chamfer mask of FIG. 1 that are used to catalog the paths going from a goal pixel placed on the central box (box indexed by 0) to the source pixel, passing through a pixel of the neighborhood whose distance has already formed the subject of an estimate in the course of the same scan. These boxes are eight in number, arranged in the upper left part of the chamfer mask. There are therefore eight paths cataloged for the search for the shortest whose length is taken as estimate of the distance.

Figure 2B:
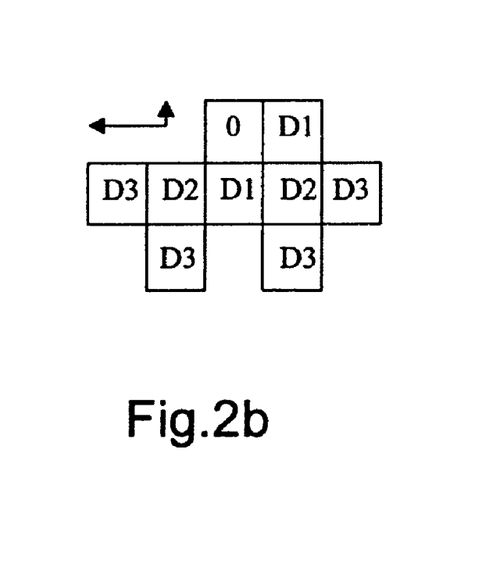

FIG. 2b shows, in the case of a scan pass in inverse lexicographic order going from the lower right corner to the upper left corner of the image, the boxes of the chamfer mask of FIG. 1 that are used to catalog the paths going from a goal pixel placed on the central box (box indexed by 0) to the source pixel, passing through a pixel of the neighborhood whose distance has already formed the subject of an estimate in the course of the same scan. These boxes are complementary to those of FIG. 2a. They are also eight in number but arranged in the lower right part of the chamfer mask. There are therefore eight paths cataloged for the search for the shortest whose length is taken as estimate of the distance.

Figure 3:
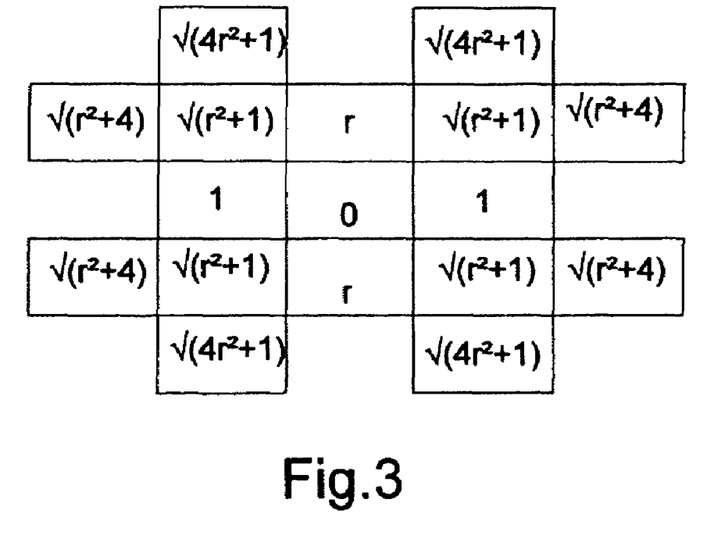

FIG. 3 shows the deformation of the geometry of a chamfer mask occasioned by the anisotropy of an image having differently spaced pixels in the direction of the rows and in the direction of the columns. The fact that the gap between two successive pixels along a column is in a ratio r, different from unity, with the gap between two successive pixels along a row, causes a deformation into ellipses of the concentric circles that previously formed the pixels of the neighborhood of first, second and third ranks. This deformation renders the neighborhood distances cataloged in the chamfer mask dependent not only on the rank but also on the orientation of the neighborhood pixel concerned in the constellation formed by the set of neighborhood pixels cataloged. Thus, among the four neighboring pixels of first rank, two situated on either side of the goal pixel placed on the central box (box indexed by 0) are at the unit distance 1, the other two also situated on either side of the pixel placed on the central box but on the same column are at the distance r. The four pixels of second rank are at one and the same distance $\sqrt{r^2+1}$ since the anisotropy considered preserves the symmetries of the meshing of pixels of the image along the rows, columns and diagonals. The eight neighboring pixels of third rank are split into two groups of four, one of the groups being at a distance $\sqrt{4r^2+1}$ and the other group at a distance of $\sqrt{r^2+4}$. It is therefore apparent that the anisotropy may modify the geometry of the constellation formed by the pixels of the neighborhood of a goal point and covered by the chamfer mask to the point of assigning values of proximity distances that all differ from one another to the boxes of the chamfer mask.

For a given multiplicative scale factor, two candidate integer values are available for the choice of each coefficient of the chamfer mask: the closest integer under-value and closest integer over-value of the product of the multiplicative factor times the Euclidian proximity distance represented by the coefficient considered. This rapidly gives numerous possibilities of choice. The problem then arises of the optimum choice of the integer values of the coefficients of the chamfer mask, optimum in the sense that it minimizes the error rate in the distance estimations of the pixels of the image.

Furthermore, when a maximum error rate x % is imposed on the distance estimations of the pixels of an image, it is beneficial, in order to limit as far as possible the calculation power required for the distance estimations, to search, in respect of the coefficients of the chamfer mask, for the combination of the smallest possible integer values making it possible to satisfy the maximum error rate x % imposed. Specifically, a solution for succeeding in satisfying an imposed maximum error rate x %, consists in increasing the multiplicative scale factor since the larger the multiplicative scale factor adopted, the more accurate are the approximations by integer values and the lower are the errors made in the distance estimations. However, the counterpart of a high multiplicative scale factor is increased calculational complexity due to the manipulation of large integer values.

The search for the optimal combination of integer values for the coefficients of a chamfer filter, either to minimize the error rate, or to comply with a prescribed maximum error rate x % is therefore tricky especially when one considers that one may be prompted to reconsider the choice of the multiplicative scale factor, if after having tested the whole set of combinations, none is suitable.

To avoid having to test all the combinations, there are several possible approaches.

A first approach consists in adopting as coefficients the integer under-values since it can be shown that the more exact are the coefficients chosen in the direction of the neighboring pixels, the more over-evaluated are the distance estimations between the axes. This approach is not satisfactory, since the error made is not controlled when the ratio r of the spacings of the pixels of the image height-wise and width-wise varies. Specifically, when r varies from 0.2 to 1, the error reaches 20% for the lowest ratios.

A second approach consists in testing only the combinations satisfying the conditions of U. Montanari expressing the fact that the straight-line distance must be the shortest. These conditions of U. Montanari pertain to two coefficients a and b of the chamfer mask that are assigned to two connected pixels of the neighborhood. One a must be positive while the other b must lie between a and 2a. The procedure remains expensive in terms of calculation time for the small ratios r since the calculation time is an exponential function of the accuracy desired for the distance estimations.

A third approach described hereinafter, consists in proceeding by progressive selection of the candidate integer values for the coefficients of a chamfer mask with, in the event of failure or of inadequate selection, a possible loop-back after modification of the multiplicative scale factor or of the imposed maximum error rate x %.

Figure 4:
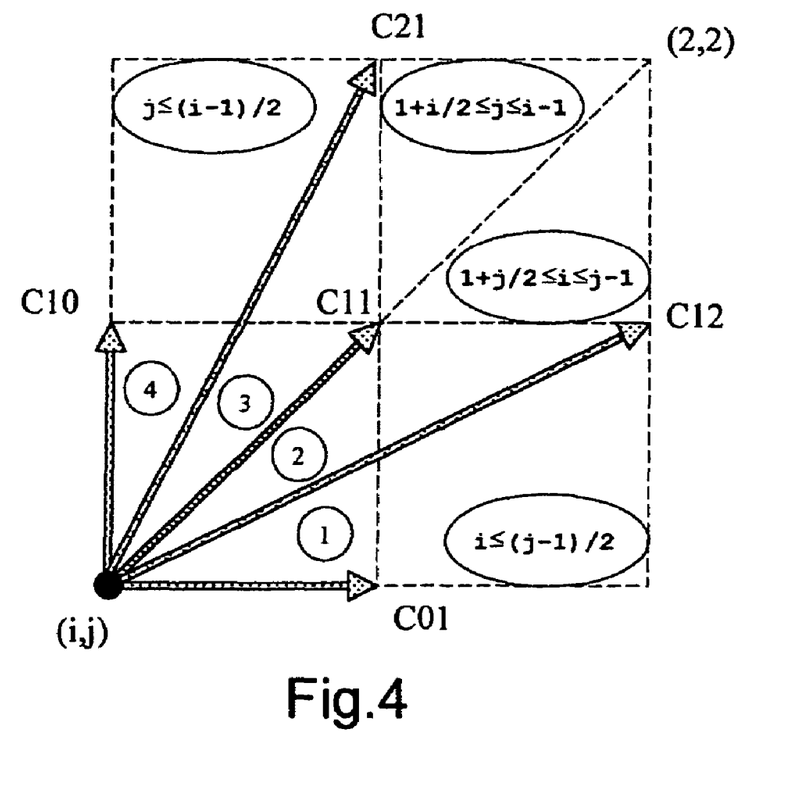

To facilitate the comprehension of this third approach by progressive selection, we make use, as shown in FIG. 4, of axes of displacement on the image, corresponding to the oriented distances separating from the source pixel, the pixels of its neighborhood that are covered by the chamfer mask. These axes of displacement all have different directions since the chamfer mask never covers two pixels of the neighborhood that are aligned with the pixel under analysis placed at its center, such coverage being redundant. On account of its definition, an axis of displacement may be associated with a coefficient $C_{i,j}$ of the chamfer mask. The axes of displacement cut the image into sectors ①, ②, ③, etc. centered on the source pixel.

In FIG. 4, only the upper right quarter of a chamfer mask is represented since it is assumed that the image preserves, despite its anisotropy, properties of axial symmetry with respect to the directions of its rows and columns.

Likewise to facilitate comprehension, terminology used by chess players will sometimes be employed:

rook displacement of two kinds along the axis $C_{0,1}$ or the axis $C_{1,0}$ to take into account a ratio r different from unity between the unit spacings of the pixels along the rows and the columns of the image, bishop displacement along a bisector $C_{1,1}$, knight displacement of two kinds along the axis $C_{1,2}$ or the axis $C_{2,1}$ again to take into account a ratio r different from unity between the unit spacings of the pixels along the rows and the columns of the image.

This third approach by progressive selection uses the property according to which, when the conditions of U. Montanari are satisfied by the coefficients of the chamfer mask, it is always possible to find among the shortest paths connecting a goal pixel to a source pixel a path employing at most only two types of displacement.

To show this, it is assumed that the chamfer mask analyzes the source pixel. The latter then has coordinates 0,0 in the reference system of the coefficients of the mask. The goal pixel, which is any point of the image other than the source pixel, may be either on an axis of displacement associated with a coefficient of the chamfer mask or in one of the sectors ①, ②, ③ or ④.

If the goal pixel is on an axis of displacement, compliance with the conditions of U. Montanari implies that the shortest path is the straight path along this axis. Estimation of its distance involves only one coefficient of the chamfer mask.

Thus, a goal pixel $C_{0,j}$ situated on the horizontal axis of displacement associated with the coefficient $C_{0,1}$ and separated from the source pixel by j intermediate pixels has an estimated distance Dtfd equal to j rook displacements of the first type:

$$Dtfd = j \cdot \text{rook}_1 = j \cdot C_{0,1}$$

A goal pixel $C_{i,2j}$ situated on the oblique axis of displacement associated with the coefficient $C_{1,2}$, still separated from the source pixel by j intermediate pixels, has an estimated distance Dtfd equal to j knight displacements of the first kind:

$$Dtfd = j \cdot \text{knight}_1 = j \cdot C_{1,2}$$

A goal pixel $C_{j,j}$ situated on the oblique axis of displacement associated with the coefficient $C_{1,1}$, still separated from the source pixel by j intermediate pixels, has an estimated distance Dtfd equal to j bishop displacements:

$$Dtfd = j \cdot \text{bishop} = j \cdot C_{1,1}$$

A goal pixel $C_{2j,j}$ situated on the oblique axis of displacement associated with the coefficient $C_{2,1}$, still separated from the source pixel by j intermediate pixels, has an estimated distance Dtfd equal to j knight displacements of the second kind:

$$Dtfd = j \cdot \text{knight}_2 = j \cdot C_{1,2}$$

A goal pixel $C_{i,0}$ situated on the vertical axis of displacement associated with the coefficient $C_{1,0}$, still separated from the source pixel by j intermediate pixels, has an estimated distance Dtfd equal to j rook displacements of second type:

$$Dtfd = j \cdot \text{rook}_2 = j \cdot C_{1,2}$$

If the goal pixel is off the axes of displacement associated with the coefficients of the chamfer mask, in one of the sectors ①, ②, ③, ④ that they delimit, compliance with the conditions of U. Montanari by the coefficients of the chamfer mask implies that one of the shortest paths connecting it to the source pixel necessarily uses the two lone axes of displacements associated with the coefficients of the chamfer mask delimiting the sector ①, ②, ③ or ④ concerned (this result is easily proved by contradiction: if a path uses three distinct types of displacement, then another shorter path can be demonstrated).

Figure 5A:
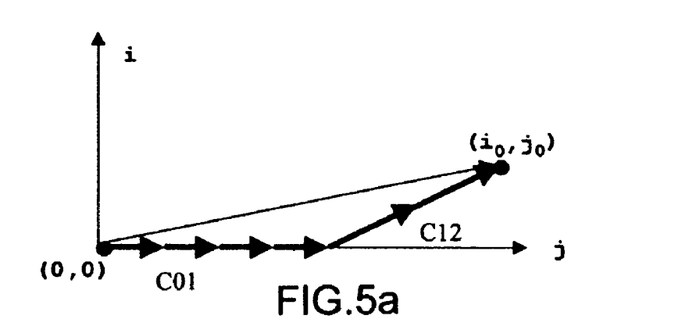

A goal pixel $C_{i0,j0}$ belonging to the sector ① whose indices i0 and j0 comply with the inequality i0<=(j0−1)/2 and which is separated from the source pixel by j0−2i0 intermediate pixels, has, as shown in FIG. 5a, an estimated distance equal to i0 rook displacements and j0−2i0 knight displacements of the first type:

$$Dtfd = (j0-2i0) \cdot \text{rook}_1 + i0 \cdot \text{knight}_1 = (j0-2i0)C_{0,1} + i0 \cdot C_{1,2}$$

To construct one of the paths of minimal length connecting the goal pixel to the source pixel, it is possible to start from the goal pixel heading in the direction of the source pixel by knight displacements of the first type, parallel to the axis of displacement associated with the coefficient $C_{1,2}$ of the chamfer mask and then, having once reached the horizontal axis, to attain the source pixel by rook displacements of the first type.

Figure 5B:
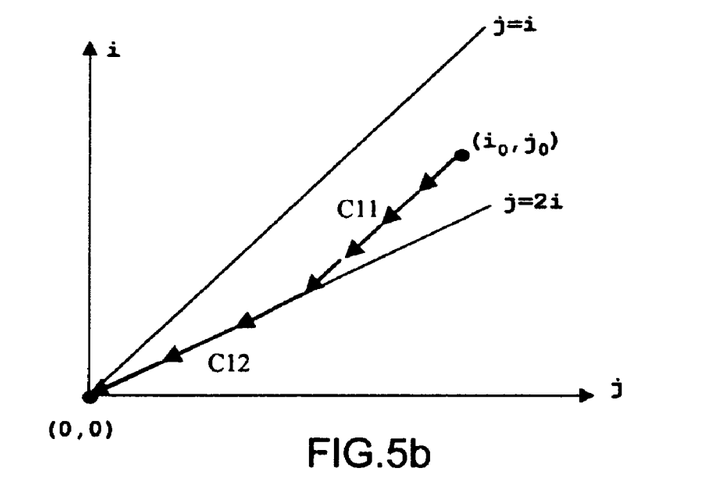

As shown by FIG. 5b, to construct one of the paths of minimal length connecting, to the source pixel, a goal pixel $C_{i0,j0}$ belonging to the sector ② with indices i0 and j0 complying with the inequality (1+j0)/2<=2<=j0−1, it is possible to start from the goal pixel heading in the direction of the source pixel by bishop displacements, parallel to the axis of displacement associated with a coefficient $C_{1,1}$ of the chamfer mask and then, having once reached the axis of displacement associated with the coefficient $C_{1,2}$, to attain the source pixel by knight displacements of the first type. The calculation of the numbers of displacements NC11 and NC12 in each of the two directions can be done by means of an algorithm of the kind:

Initialization
  NC11=0
  i=i0
  j=j0
We descend . . .
  While (i>j/2)
    j=j−1
    i=i−1
    NC11=NC11+1
We complete . . .
  NC12=(j0−NC11)/2

In the last two sectors ③, respectively ④, where the indices i0 and j0 of the pixels satisfy the inequality (1+i0)/2<=j0<=i0−1, respectively j0<=(i0−1)/2, the construction of a path of minimal length using only the two axes of displacement plotted along their sides and the determination of the numbers of displacements in each of the two directions of which it is composed, are done in an analogous manner.

The existence, among the shortest paths connecting a goal pixel to a source pixel, of a path which uses, at most, only the two axes of displacement plotted along the sides of the sector to which the goal point belongs and the numbers of whose displacements along these two axes are determinable by the calculation, is exploited, in the approach, by progressive selection, of the optimal combination of integer values for the coefficients of the chamfer mask, to simplify the assessment of a maximum distance estimation error rate made in the image.

In the approach, by progressive selection, of the optimal combination of integer values for the coefficients of the chamfer mask, the assessment of the maximum error rate in the distance estimations of the pixels of the image resulting from the future selection made is done in several steps. In a first step, it relates only to the pixels situated on the axes of displacements associated with the coefficients of the mask. Then it is subsequently extended progressively to the remainder of the image analyzed by successive sectors delimited by the axes of displacements associated with the coefficients of the mask. This progressive analysis of the image for the assessment of the maximum error rate in the distance estimations resulting from the selection made makes it possible to undertake jointly a selection of the candidate integer values for the coefficients of the chamfer mask, which values are considered individually or in pairs and not at the level of the possible complete combinations, thereby considerably decreasing the number of cases to be envisaged.

By taking into account the axial symmetries of the image and the isotropy of the error rate in the distance estimations of the pixels aligned with the source pixel it is possible to limit the analysis of the image done for the assessment of the maximum error rate to a small number of pixel, this further simplifying the operations.

The maximum error rate in the distance estimations of goal pixels placed on the axes of displacement associated with the coefficients of the chamfer mask depends only on the coefficient associated with the axis of displacement concerned and hence only on the candidate integer values for this coefficient. Its determination is very rapid since it corresponds to the error rate of the over- or under-approximation of the Euclidian neighborhood distance to which a candidate integer value for the coefficient concerned corresponds.

If there is a maximum allowable error rate x %, the assessment of this maximum axis error rate for each candidate integer value serves for a first sort operation making it possible to discard the integer values not complying with the maximum allowable error rate x %. The discarding of an integer value fixes the choice of a coefficient since the latter has only two candidate integer values, one over-approximating and the other under-approximating the Euclidian proximity distance that it represents. The discarding of the two candidate integer values for one and the same coefficient eliminates any possibility of choice and compels a reconsideration of the multiplicative scale factor or of the maximum allowable error rate x %.

If there is no maximum allowable error rate x %, the maximal axis error rates are attached to the candidate integer values in the guise of assessment score taken into account in a subsequent selection.

The maximum error rate in the distance estimations of the goal pixels belonging to a sector delimited in the image by axes of displacement associated with the coefficients of the chamfer mask centered on the source pixel depends only on the values of the pair of coefficients of the chamfer mask that are associated with the axes of displacement constituting the sides of the sector. It is therefore to be assessed for all the pairs of integer values that it is possible to construct from the two pairs of candidate integer values for the two coefficients considered. There are at most four possible pairs.

Within a sector of the image not all the pixels are to be tested since the distance estimations made over pixels aligned with respect to the source pixel exhibit the same relative error.

Figure 6:
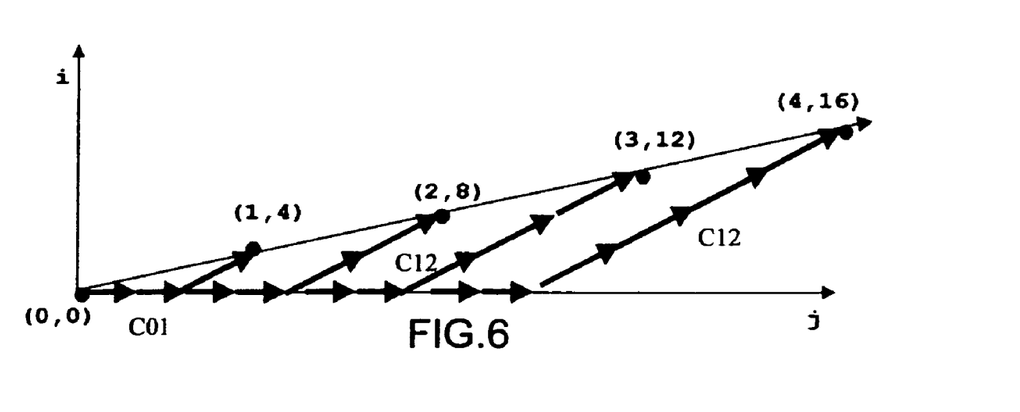

Specifically, let us consider FIG. 6 showing various goal pixels $P_{1,4}, P_{2,8}, P_{3,12}$ and $P_{4,16}$ disposed in the first sector ①, in alignment with a source pixel $P_{0,0}$ placed at the origin of the reference frame. We saw that one of the shortest paths connecting a goal pixel $P_{1,4}, P_{2,8}, P_{3,12}$, or $P_{4,16}$ to the source pixel $P_{0,0}$ uses only the two axes of displacements which define the sides of the first sector ① and which are associated with the coefficients $C_{0,1}$ and $C_{1,2}$. These shortest paths represented in the figure by a succession of thick arrows form the two sides of a triangle having as base the straight segment connecting the goal point considered to the source point. It is noted that the triangles standing on the various goal points are homothetic. This property of homothety preserves for all the goal points considered $P_{1,4}, P_{2,8}, P_{3,12}$ and $P_{4,16}$ the ratio between the length of the base which corresponds to the Euclidian distance and the sum of the lengths of the other two sides which corresponds to the distance estimation so that the relative error made in the distance estimation is the same for all these points.

To assess the maximum rate of error made in the distance estimations of all the pixels of a sector of the image, one then merely tests a single pixel from among the pixels having the same orientation with respect to the source pixel.

This isotropy property makes it possible to limit the calculation of the maximum of distance estimation error rate over a sector to a number of pixels of the image corresponding to the number of the various possible orientations for a pixel in the sector. For the whole set of sectors of the image, the total number of pixels considered in the assessments of the maximum sector error rates corresponds to the number of the various possible orientations in the image for a goal pixel with respect to the source pixel and even to a submultiple of this number when the image has symmetry properties.

If there is a maximum allowable error rate x %, the assessment of the maximum sector error rate for each pair of candidate integer values for two coefficients of the chamfer mask that are associated with connected axes of displacement that it was possible to construct after the first sort operation based on the maximum axis error rate, serves for a second sort operation making it possible to discard the binomials of candidate integer values for pairs of coefficients not complying with the maximum allowable error rate x %.

Each discard of a binomial of integer values reduces the possibilities of choice of combination of integer values for the coefficients. If, after this second sort operation the choice of a combination turns out to be impossible, it is necessary to reconsider the multiplicative scale factor or the maximum allowable error rate x % and to recommence the selection operations from the start.

In the case where it is possible to extract binomials of candidate integer values that have negotiated the second sort operation, an integer value for each coefficient of the chamfer mask, the combination found is subjected to a last test consisting in verifying that its integer values comply with the conditions of U. Montanari (formalization of the truism: "the shortest route between two points is a straight line"):

$C_{1,2} < C_{0,1} + C_{1,1}$ $C_{1,1} < C_{0,1} + C_{1,0}$ $C_{2,1} < C_{1,0} + C_{1,1}$

As the distance estimations effected in a sector for testing whether the errors made comply with the maximum permitted error rate x % make use of only two coefficients of the chamfer mask, those associated with the axes of displacement limiting the sector, by proceeding sector by sector it is possible to progressively validate, pair of coefficients by pair of coefficients, the integer values of a combination. Thus, in the first sector, the test of the error rate in the first sector makes it possible to validate the integer values assigned to the pair of coefficients $C_{0,1}$, $C_{1,2}$. In the second sector, it makes it possible to validate the integer values assigned to the pair of coefficients $C_{1,2}$, $C_{1,1}$ etc.

This progressive validation simplifies the calculation because it makes it possible to abandon, in all the potential combinations, an integer value for a coefficient that has not satisfied the test of the error rate in a sector.

This approach prevents combinatorial explosion related to the tests of all the sets of coefficients that are possible a priori.

For a given scale factor n, progressive selection may end in the eliminating of all the combinations or on the contrary in the authorizing of a large number of combinations. It is therefore necessary to judiciously set the maximum allowable error rate x % low enough to have an interesting result and high enough as to obtain just one result. A solution to this dilemma consists in choosing at the outset a maximum allowable error rate x % that is sufficiently low for the progressive selection process to eliminate all the combinations and then to recommence the progressive selection process, increasing the maximum allowable error rate x % by a fixed interval until at least one of the combinations negotiates the selection process. This solution is fast since if the maximum allowable error rate x % is too low, sectors of the pixels whose distance estimation error exceeds this rate will rapidly be found in the first few points tested.

In the case where progressive selection leads to several possible combinations, it is possible either to recommence progressive selection while decreasing the maximum allowable error rate x %, or to choose one of them at random or as a function of a preference criterion pertaining to a property of the combinations such as for example the combination the sum of whose integer values is minimal.

If we do not seek to comply with a maximum allowable error rate but rather the values of coefficients of the chamfer mask that are optimal from the point of view of the maximum error rate made in the distance estimations in the image for a given multiplicative scale factor, the assessment of the maximum sector error rate for each pair of candidate integer values for two coefficients of the chamfer mask that are associated with connected axes of displacement is not used for a sort operation but in the guise of assessment score of each pair of candidate integer values for a final selection. In the course of the final selection, the various pairs of candidate integer values are assigned three assessment scores, two scores relating to the axis error rates of the two integer values of which they are composed and a score relating to the sector error rate, the largest of which is adopted as overall score since a combination is constructed progressively from the binomials of candidate integer values, taking the coefficients in the order of the sectors and on each occasion choosing the binomial matching with the previous one (same integer value for the last coefficient chosen) and having the lowest notation.

Figure 7:
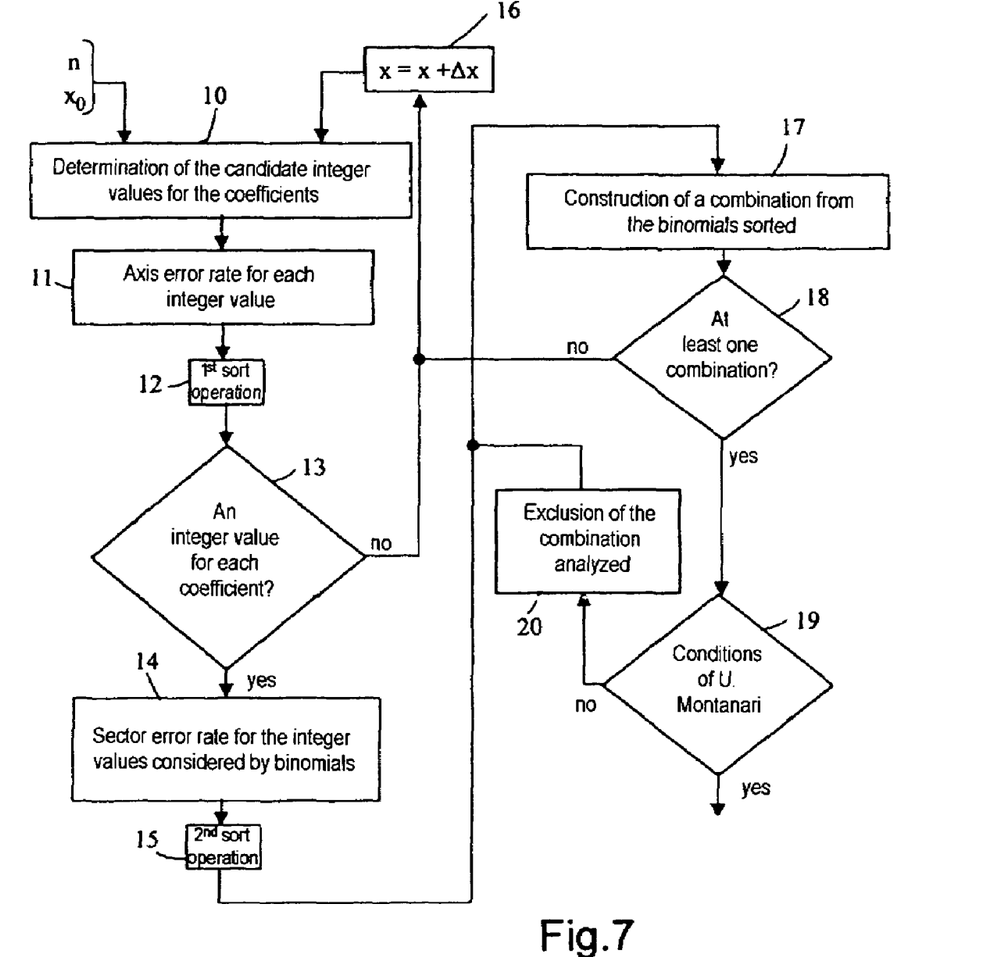

FIG. 7 summarizes the main steps of a method of determining the optimal coefficients of a chamfer mask in the presence of a prescribed multiplicative scale factor n and of a maximum allowable error rate x %.

In the course of a first step 10, the candidate integer values for each coefficient are calculated. These candidate integer values are, for each coefficient, the two integers best over- and under-approximating the product of the multiplicative scale factor n times the Euclidian proximity distance corresponding to the coefficient considered.

In the course of a second step 11, the distance estimation error rate for image pixels situated on the axis of displacement associated with each coefficient is calculated by giving the coefficient considered the values of the pair of candidate integer values which is assigned to it. This calculation consists in determining for each candidate integer value, the error rate of the approximation that it represents.

In the course of a third step 12, the candidate integer values corresponding to an axis error rate greater than the maximum allowable error rate x % are eliminated.

In the course of a fourth step 13, the existence, after the first sort operation, of at least one candidate integer value for each coefficient is tested.

If it emerges that a coefficient no longer has any candidate integer value, the method of determining the optimal coefficients of the chamfer mask is aborted and resumed from the start thereof after having increased at 16 the maximum allowable error rate x %.

If all the coefficients have at least one candidate integer value, the method of determining the optimal coefficients of the chamfer mask continues with a fifth step 14 in the course of which the distance estimation error rate for pixels belonging to the sectors delimited in the image by connected axes of displacement associated with the coefficients of the chamfer mask are calculated for all the binomials of integer values that it is possible to construct from the two pairs of candidate integer values for the two coefficients considered and that was a survivor of the first sort operation.

The fifth step 14 is followed by a sixth step of sort operation 15 in the course of which the binomials of candidate integer values giving sector error rates greater than the maximum allowable rate x % are eliminated.

In the course of a seventh step 17, after the first and second sort operations 12 and 15, the construction, on the basis of the binomials of integer values, of combinations of integer values for each of the coefficients of the chamfer mask is commenced. This construction may be a progressive construction taking the coefficients in the order of the sectors and choosing on each occasion the binomial matching with the previous one (same integer value for the last coefficient chosen).

In the course of an eighth step 18, the presence of at least one combination is tested. If it has not been possible to construct any combination, the method of determining the optimal coefficients of the chamfer mask is aborted and resumed at its start after having increased at 16 the maximum allowable error rate x %. If a combination is present, the method of determining the optimal coefficients of the chamfer mask continues with a last step 19 of verifying the conditions of U. Montanari.

In case of nonsatisfaction of the conditions of U. Montanari by the combination examined, the latter is eliminated and another is extracted from the binomials of integer values by return to step 17 after elimination at 20 of the combination previously analyzed.

Figure 8:
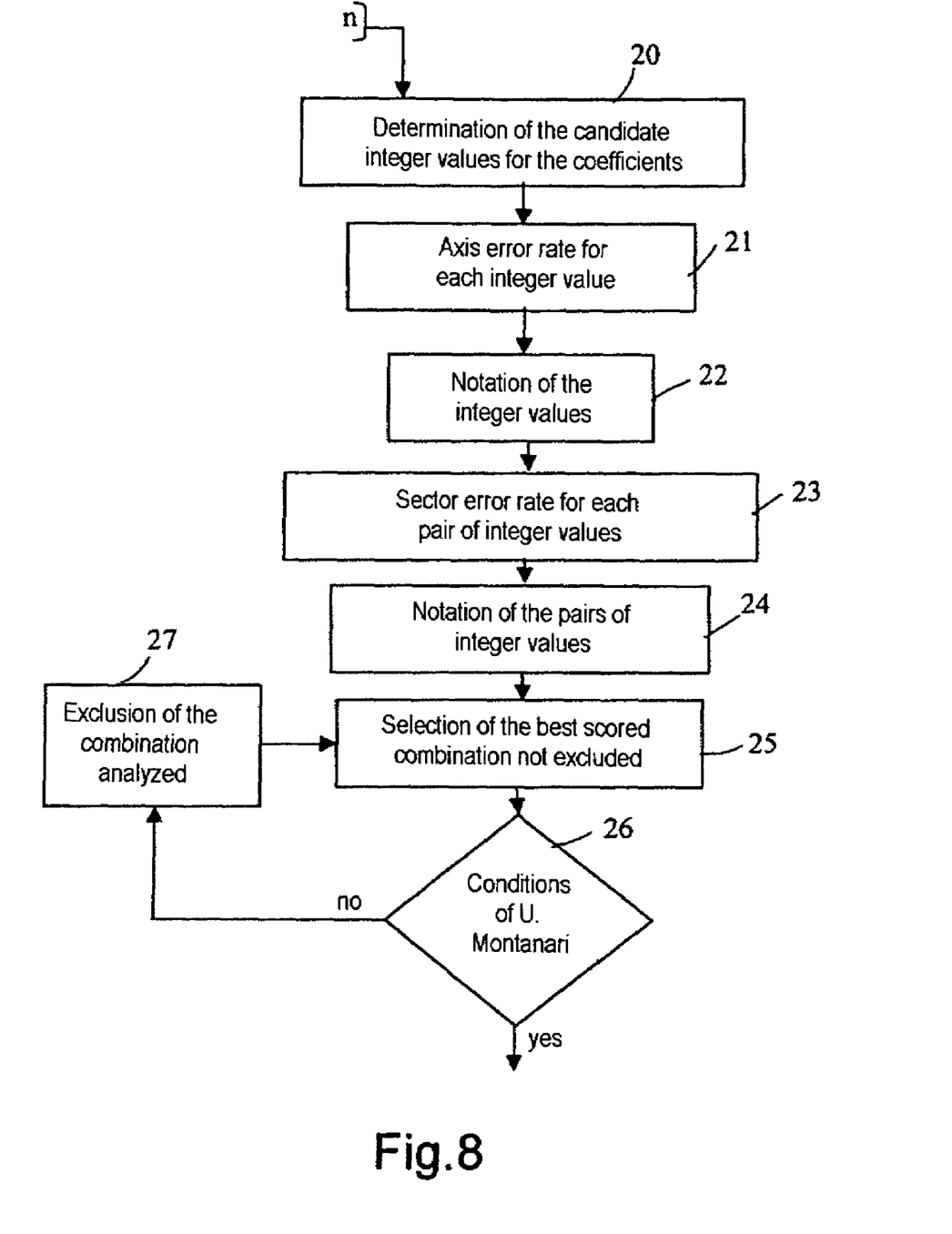

FIG. 8 summarizes the main steps of a method of determining the optimal coefficients of a chamfer mask in the presence of a prescribed multiplicative scale factor n but with no maximum allowable error rate x %.

In the course of a first step 20, the candidate integer values for each coefficient are calculated. These candidate integer values, are, for each coefficient, the two integers best over-approximating and under-approximating the product of the multiplicative scale factor n times the Euclidian proximity distance corresponding to the coefficient considered.

In the course of a second step 21, the distance estimation error rate for image pixels situated on the axis of displacement associated with each coefficient is calculated for the pair of candidate integer values for the coefficient considered. This calculation consists in determining for each value the error rate of the approximation that it represents.

In the course of a third step 22, the axis error rate calculated for each candidate integer value is used for the notation of the candidate integer values.

In the course of a fourth step 23, the distance estimation error rate for pixels belonging to the sectors delimited in the image by connected axes of displacement associated with the coefficients of the chamfer mask are calculated for all the binomials of integer values which it is possible to construct from the two pairs of candidate integer values for the two coefficients considered and which were survivors of the first sort operation.

In the course of a fifth step 24, the binomials of integer values that served in the calculations of the error rates receive as notation, the highest value of the sector error rate which corresponds to them and axis error rates associated with the integer values of which they are composed.

In the course of a sixth step 25, a combination of integer values for each of the coefficients of the chamfer mask is constructed progressively from the binomials of candidate integer values, taking the coefficients in the order of the sectors and choosing on each occasion the binomial matching with the previous one (same integer value for the last coefficient chosen) and having the lowest notation.

In the course of a seventh step 26, the combination obtained is tested to ensure that it satisfies the conditions of U. Montanari. If the conditions are satisfied, it is chosen for the coefficients of the chamfer mask. If the conditions are not satisfied, it is rejected at 27 and another is constructed by return to the sixth step 25 and change of one at least of the binomials used in the construction of the new combination.

Figure 9:
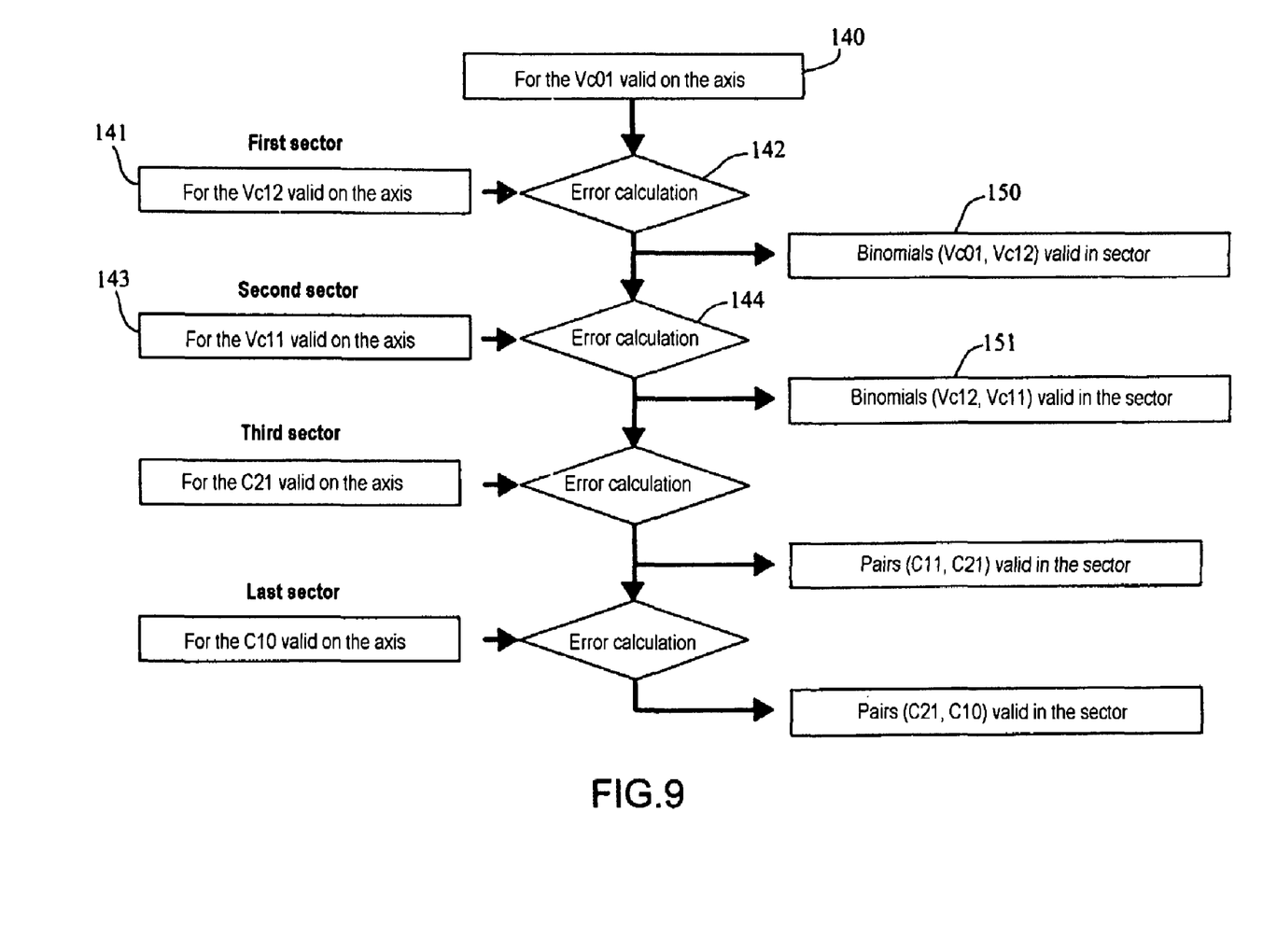
FIG. 9 is a chart detailing steps of the method illustrated in FIG. 7.

FIG. 9 details the steps 14 and 15 of selecting the candidate integer values as a function of the sector error rate in the case of a chamfer mask with 16 coefficients and with axial symmetries along the rows and columns, as the one illustrated in FIG. 4.

The candidate integer values $V_{c01}$, $V_{c12}$, $V_{c11}$, $V_{c21}$, $V_{c10}$ for the five categories of coefficient that are represented by the coefficients: $C_{0,1}$, $C_{1,2}$, $C_{1,1}$, $C_{2,1}$, $C_{1,0}$ are assumed to have negotiated the first sort operation (12 FIG. 7) and to be under the x % of error in the axes.

Firstly, the candidate integer value or values $V_{c01}$ and $V_{c12}$ for the coefficients $C_{0,1}$ and $C_{1,2}$ associated with the axes of displacement delimiting are sorted by binomial, employing as sort criterion the error to which they give rise in the distance estimations for pixels situated in the sector (①FIG. 4) delimited by the axes of displacement associated with the coefficients $C_{0,1}$ and $C_{1,2}$. To do this, in the course of a first step 140, we choose one of the candidate integer values $V_{c01}$ for the coefficient $C_{0,1}$. In the course of a second step, 141, we adjoin to it one of the candidate integer values $V_{c12}$ for the coefficient $C_{1,2}$. In the course of a third step 142 we calculate the distance estimation error caused by the binomial formed $(Vc_{01}, Vc_{12})$ on the pixels of the sector (①FIG. 4) delimited by the axes of displacement associated with the coefficients $C_{0,1}$ and $C_{1,2}$. Ultimately we retain, in step 150, the binomial formed only if the sector error calculated is less than the maximum allowable error rate x % and we recommence for all the binomials that it is possible to form with the candidate integer values $V_{c01}$ and $V_{c12}$ for the coefficients $C_{0,1}$ and $C_{1,2}$ retained in the first sort operation (12 FIG. 4). We thus have, in step 150 just the binomials $(Vc_{01}, Vc_{12})$ making it possible to comply with the maximum allowable error rate x %.

Secondly, we do the same with the candidate integer value or values $V_{c12}$ for the coefficient $C_{1,2}$ featuring in step 150 in the binomials $(Vc_{01}, Vc_{12})$ retained firstly and the candidate integer value or values $Vc_{11}$ for the coefficient $C_{1,1}$, employing as sort criterion the error to which they give rise in the distance estimations for pixels situated in the sector (②FIG. 4) delimited by the axes of displacement associated with the coefficients $C_{1,2}$ and $C_{1,1}$. To do this, we retain a candidate integer value Vc12 featuring in the binomials $(Vc_{01}, Vc_{12})$ retained in step 150 and we adjoin to it, in the course of a step 143, one of the candidate integer values Vc12 for the coefficient $C_{1,2}$. In the course of a step 144 we calculate the distance estimation error caused by the binomial formed $Vc_2, Vc_{11})$ on the pixels of the sector (② FIG. 4) delimited by the axes of displacement associated with the coefficients $C_{1,2}$ and $C_{1,1}$ and we ultimately retain, in step 151, the binomial formed only if the sector error calculated is less than the maximum allowable error rate x %. We recommence for all the binomials that it is possible to form with the candidate integer values Vc12 for the coefficient $C_{1,2}$ appearing in the binomials retained in step 150 and with the candidate integer values Vc12 for the coefficient $C_{1,1}$ that were retained in the first sort operation (12 FIG. 4). We thus have, in step 151 just the binomials $(Vc_{01}, Vc_{12})$ and $(Vc_{12} Vc_{11})$ making it possible to comply with the maximum allowable error rate x %.

Thirdly, we do the same with the candidate integer value or values $V_{c11}$ with the coefficient $C_{1,1}$ featuring in step 151 in the binomials $(Vc_{12}, Vc_{11})$ retained secondly and the candidate integer value or values $Vc_{21}$ for the coefficient $C_{2,1}$, employing as sort criterion the error to which they give rise in the distance estimations for pixels situated in the sector (③ FIG. 4) delimited by the axes of displacement associated with the coefficients $C_{1,1}$ and $C_{2,1}$ and so on and so forth fourthly.

Finally, we have binomials of values of candidate integer values for the coefficients which we are sure lead to values of coefficients complying with the maximum allowable error rate x % in the distance estimations in the image.

This approach avoids combinatorial explosion related to the tests of all the sets of coefficients that are possible a priori.

The methods of determining the optimal coefficients of a chamfer mask that have just been described apply advantageously to the chamfer masks used for the estimation of the distances, with respect to a craft, of the points of a zone of the terrestrial surface where it is deploying, when this zone is represented by a two-dimensional map derived from a terrain elevation data base produced on the basis of a regular latitude and longitude meshing of the terrestrial surface.

Specifically, in such a case, the image formed by the map is anisotropic since its pixels, which correspond to the locations of the elevation measurement points featuring in the terrain elevation database, have a unit divergence in the direction of the parallels varying as a function of latitude on account of the converging of the meridians in the direction of the poles. Therefore, the square pattern formed, at low latitudes, by the points of a terrain elevation database with regular latitude and longitude mesh for a low or zero latitude is deformed into a more and more trapezoidal pattern as the latitude increases. This deformation compels a modification of the coefficients of the chamfer filter as a function of the latitude of the craft so as to preserve the same accuracy in the distance estimations.

For an accurate terrain elevation database, with a regular latitude and longitude mesh of 15" of arc up to the latitude of 75° and, beyond, a single elevation valid for the whole of the polar cap, the anisotropy of the image formed by a map of zone of deployment can be dealt with by slicing the surface of the globe into bands of latitude 6° wide and by associating with each of these bands a particular set of optimal coefficients of a chamfer mask determined for the mid-line of this band by likening the pattern of the mesh to a rectangle with a ratio r of the unit spacing of the pixels in latitude to the unit spacing of the pixels in longitude equal to the cosine of the latitude:

r=cos(Latitude)

With a multiplicative scale factor of 100 to 1000, we succeed in finding optimal chamfer mask coefficients making it possible to comply with a distances estimation error rate of less than 2% in a latitude range going from 0 to 35° and of less than 8% beyond.

In this application, the methods of determining the optimal coefficients of a chamfer mask which have just been described make it possible to correct, without preprocessing, the convergence of the meridians towards the poles while guaranteeing a minimum relative error with respect to the orthodromic distance and while taking into account the best available resolution of a terrain elevation database.

The invention claimed is:

1. A method for determining optimal coefficients $C_{i,j}$, i being a row index varying from –P to +P and j a column index varying from –Q to +Q, P and Q being positive integers, of a distance transform chamfer mask providing estimations of distance between pixels of an image, said coefficients being approximations, to within a multiplicative scale factor n, n being a positive integer, of the distances of an image pixel subjected to the analysis of the chamfer mask with respect to the image pixels that are closest in the various so-called pixel directions of the mask, each coefficient being associated with the pixel of the mask whose distance it represents, and the determination consisting of a choice, for each coefficient, of a value selected from among a set of integer candidate values for the coefficient considered, said method comprising:

a first sort operation among the integer candidate values for each coefficient with, as a first sort criteria, a maximum distance estimation error rate caused by the choice of a candidate value for a coefficient, in the estimations of distances of the image pixels aligned on an axis of displacement of the image corresponding to the direction going from an origin source pixel for the distance measurements that is subjected to the analysis of the chamfer mask to the pixel of the mask associated with the coefficient considered, a second sort operation among the integer candidate values issued from the first sort operation with, as second sort criteria, a maximum distance estimation error rate caused by the choice of two candidate values for a pair of coefficients, in the distance estimations of the image pixels contained in an angular sector of the image, delimited by two axes of displacement of the image corresponding to the directions going from the source pixel subjected to the analysis of the chamfer mask to the two pixels of the mask that are associated with the coefficients considered, an arbitrary selection operation of an integer candidate value issued from the first and second sorts for each coefficient whenever there is at least one integer candidate value issued from the first and second sort operations for each coefficient, an aborting operation of determining the optimal coefficients whenever there is not at least one integer candidate value issued from the first and second sort for each coefficient, and developing a two-dimensional map using the optimal coefficients.

2. The method as claimed in claim 1, applied in the presence of a prescribed maximum error rate x %, which comprises the following steps:

calculation, as a function of the multiplicative scale factor n, of the pairs $A_{i,j}$ of integer values corresponding to the under- and over-approximations of each of the distances of the pixels of the mask with respect to the pixel subjected to the analysis of the mask, the integer values of a pair $A_{i,j}$ being candidates for the coefficient $C_{i,j}$ of the chamfer mask assigned to the pixel of the mask of which they are an approximation of the distance, adoption of a pixel of the image as origin source pixel for the distance measurements, calculation, for each candidate integer value for a coefficient, of the distance estimation error rate for image pixels aligned on an axis of displacement of the image corresponding to the direction going from an origin source pixel for the distance measurements that is subjected to the analysis of the chamfer mask to the pixel of the mask associated with the coefficient considered, first sort operation among the candidate integer values consisting in eliminating those for which the axis error rate exceeds the maximum allowable error rate x %, stopping of the determination of the coefficients of the chamfer mask as soon as the two integer values of one of the pairs $A_{i,j}$ are eliminated, if all the initial pairs $A_{i,j}$ retain at least one integer value after the first sort operation, continuation of the determination of the coefficients of the mask by splitting the chamfer mask and the image into 2(P+Q) mutually contiguous oriented angular sectors $S_k$ having as vertex, the pixel under analysis and, as sides, axes of displacement of the image corresponding to the direction going from the source pixel subjected to the analysis of the chamfer mask to a pixel of the mask, and encompassing no other pixel of the mask, calculation, for each angular sector $S_k$ and for each binomial of candidate integer values for the two coefficients associated with the two pixels of the mask that are placed on the sides of the angular sector $S_k$ considered of the distance estimation error rate for pixels of the image belonging to the sector $S_k$ considered, second sort operation among the binomials of candidate integer values for two coefficients associated with two pixels of the mask that are placed on the sides of an angular sector $S_k$ consisting in rejecting those for which the axis error rate exceeds the maximum allowable error rate x %, construction, on the basis of the binomials of integer values arising from the second sort operation, of a combination of candidate integer values for each of the coefficients of the chamfer mask, testing of the result of the construction, if it was not possible to construct any combination stoppage of the determination of the coefficients of the chamfer mask, if it was possible to construct at least one combination, adoption of one of them for the coefficients of the chamfer mask.

3. The method as claimed in claim 2, which furthermore comprises a step of verification of compliance with the predetermined conditions by the combination adopted following the construction step.

4. The method as claimed in claim 2, wherein said construction, on the basis of the binomials of integer values arising from the second sort operation, of a combination of candidate integer values for each of the coefficients of the chamfer mask is done progressively, taking the coefficients in the order of the angular sectors.

5. The method as claimed in claim 2, which is iteratively repeated with an increase in the maximum error rate x % prescribed each time that it ends in a failure, either following the first sort operation, or following the second sort operation.

6. The method as claimed in claim 2, which is iteratively repeated with an increase in the multiplicative scale factor n each time that it ends in a failure, either following the first sort operation, or following the second sort operation.

7. The method as claimed in claim 2, which is applied with a maximum initial prescribed error rate $x_0$% that is small enough for it not to end and that it is repeated while progressively increasing the maximum prescribed error rate x % until the construction step ends with a combination of candidate integer values for all the coefficients of the chamfer mask.

8. The method as claimed in claim 1, which comprises the following steps:

calculation, as a function of the multiplicative factor n, of the pairs $A_{i,j}$ of integer values corresponding to the under- and over-approximations of each of the distances of the pixels of the mask with respect to the pixel subjected to the analysis of the mask, the integer values of a pair $A_{i,j}$ being eligible for the coefficient $C_{i,j}$ of the chamfer mask assigned to the pixel of the mask of which they are an approximation of the distance, adoption of a pixel of the image as origin source pixel for the distance measurements, calculation, for each candidate integer value for a coefficient, of the distance estimation error rate for image pixels aligned on an axis of displacement of the image corresponding to the direction going from an origin source pixel for the distance measurements that is subjected to the analysis of the chamfer mask to the pixel of the mask associated with the coefficient considered, assigning to each candidate integer value, in the guise of notation, of the axis error rate corresponding thereto, calculation, for each angular sector $S_k$ and for each binomial of candidate integer values for the two coefficients associated with the two pixels of the mask that are placed on the sides of the angular sector $S_k$ considered, of the distance estimation error rate for pixels of the image belonging to the sector $S_k$ considered, assignment, to each binomial of candidate integer values that served for the calculation of a sector error rate, of a notation consisting of the highest value of the sector error rate corresponding thereto and of the axis error rates associated with the candidate integer values of which it is composed, and construction of a combination of candidate integer values for each of the coefficients of the chamfer mask, on the basis of the binomials of integer values having the smallest possible notations.

9. The method as claimed in claim 8, which furthermore comprises a step of verification of compliance with the predetermined conditions by the combination adopted following the construction step.

10. The method as claimed in claim 8, wherein the construction, on the basis of the binomials of integer values, of a combination of candidate integer values for each of the coefficients of the chamfer mask is done progressively, taking the coefficients in the order of the angular sectors.

11. The method as claimed in claim 1, which is applied to the determination of the optimal coefficients of chamfer masks used for the estimation of the distances, with respect to a craft, of the points of a zone of the terrestrial surface where it is deployed, when this zone is represented by the two-dimensional map, derived from a terrain elevation database produced using a regular latitude and longitude meshing of the terrestrial surface.

12. The method as claimed in claim 11, which is applied to the determination of the optimal coefficients of a chamfer mask that are valid for ranges of latitude covering that of the zone of deployment of the craft.

* * * * *